United States Patent [19]

Welch et al.

[11] Patent Number: 5,240,223
[45] Date of Patent: Aug. 31, 1993

[54] REUSEABLE MOLD FOR FORMING A HOLLOW AGGREGATE FILLED THERMOSET ARTICLE

[75] Inventors: William L. Welch, Houston; Don W. Sluder; Richard L. Cory, both of Lake Jackson, all of Tex.

[73] Assignee: Apt, Inc., Cypress, Tex.

[21] Appl. No.: 816,150

[22] Filed: Dec. 31, 1991

[51] Int. Cl.$^5$ .............................................. B29C 39/00
[52] U.S. Cl. .................... 249/63; 249/66.1; 249/134; 249/144; 249/149; 249/166; 425/437
[58] Field of Search ............... 249/63, 144, 160, 168, 249/146, 149, 134, 66.1, 166; 248/679; 425/437

[56] References Cited

U.S. PATENT DOCUMENTS

| | | | |
|---|---|---|---|
| 813,439 | 2/1906 | Landon | 249/144 |
| 829,586 | 8/1906 | Hubbard | 249/149 |
| 939,059 | 11/1909 | Morris | 249/149 |
| 943,860 | 12/1909 | Brown | 249/149 |
| 959,438 | 5/1910 | Blose | 249/144 |
| 1,014,360 | 1/1912 | Allen | 249/144 |
| 3,136,024 | 6/1964 | Monica | 249/144 |
| 3,374,983 | 3/1968 | Garretson et al. | 425/437 |
| 3,952,990 | 4/1976 | Garcia | 249/63 |
| 4,351,507 | 9/1982 | Toffolon et al. | 249/63 |
| 4,842,241 | 6/1989 | Fitzgerald et al. | 249/134 |
| 5,165,651 | 11/1992 | Welch et al. | 248/678 |

Primary Examiner—Jay H. Woo
Assistant Examiner—Robert B. Davis
Attorney, Agent, or Firm—Kurt S. Myers

[57] ABSTRACT

The present invention is directed to a reuseable mold for casting a hollow form made of an aggregate filled thermosetting resin. The reuseable mold includes an outer mold, made from sheets of thermoplastic resin, and an inner mold, also made from sheets of thermoplastic resin, having a base with plugable opening(s) for connecting an air supply for popping the inner mold from the cast hollow form fabricated in the reuseable mold. The sheets are preferably 1" sheets of polyethylene.

12 Claims, 4 Drawing Sheets

REUSEABLE MOLD FOR FORMING A HOLLOW AGGREGATE FILLED THERMOSET ARTICLE

FIELD OF THE INVENTION

The present invention is directed to a reuseable mold for casting a hollow form made of an aggregate filled thermosetting resin. More specifically, the reuseable mold comprises an outer mold, made from sheets of thermoplastic resin, and an inner mold, also made from sheets of thermoplastic resin, having a base with plugable opening(s) for connecting an air supply for popping the inner mold from the cast hollow form fabricated in the reuseable mold.

BACKGROUND OF THE INVENTION

U.S. Pat. No. 5,165,651 discloses a method of fabrication of a hollow form made of an aggregate filled thermosetting resin, the disclosure of which is incorporated herein by reference. In this application, a two-piece male-female mold is constructed of plywood. Pressboard was also used to fabricate the two-piece male-female mold. In each instance only one hollow form was made from each two-piece male-female mold. To remove the hollow form fabricated in the plywood or pressboard mold required that the plywood or pressboard be torn free of the form.

The present invention overcomes the disadvantages of the plywood or pressboard molds in a number of ways. First, the high cost in labor and materials in fabricating multiple molds is eliminated, each plywood or pressboard mold taking two to six man days of labor to fabricate and essentially no recovery of material. Second, a standardization of the hollow forms results from a reuseable mold, the size of the upper surface of the form can be easily duplicated. There are other advantages in the use of thermoplastic sheets, especially polyethylene sheets, in that the aggregate filled thermosetting resins used in fabricating the form do not stick to the thermoplastic once the thermosetting resin cures and cools. Further, the thermoplastic sheets are easily cleaned for reuse and the strength of the sheets are such that the same mold may be used over and over again.

SUMMARY OF THE INVENTION

The present invention is directed to a reuseable mold which comprises an outer female mold comprising a base, two sides and two ends, each made of a thermoplastic sheet; an inner male mold comprising a v-shaped base, two pentagonal sides and two trapezoidal ends, each made of a thermoplastic sheet, the v-shaped base having plugable openings for connecting an air supply; and means for securing the inner mold in the outer mold to maintain a space between the respective bases, sides and ends for pouring a slurry of reinforced thermosetting resin.

BRIEF DESCRIPTION OF THE PREFERRED EMBODIMENTS

The preferred embodiment of the reuseable mold 10 of the present invention is used to fabricate the forms described in U.S. patent application Ser. No. 07/625,293 and now U.S. Pat. No. 5,165,651, specifically, the hollow form made of an aggregate filled thermosetting resin. As disclosed therein the precast form is used as an element of a machine foundation, providing a unified supporting corrosion resistant foundation for machines such as pumps.

Figures 1, 1A:
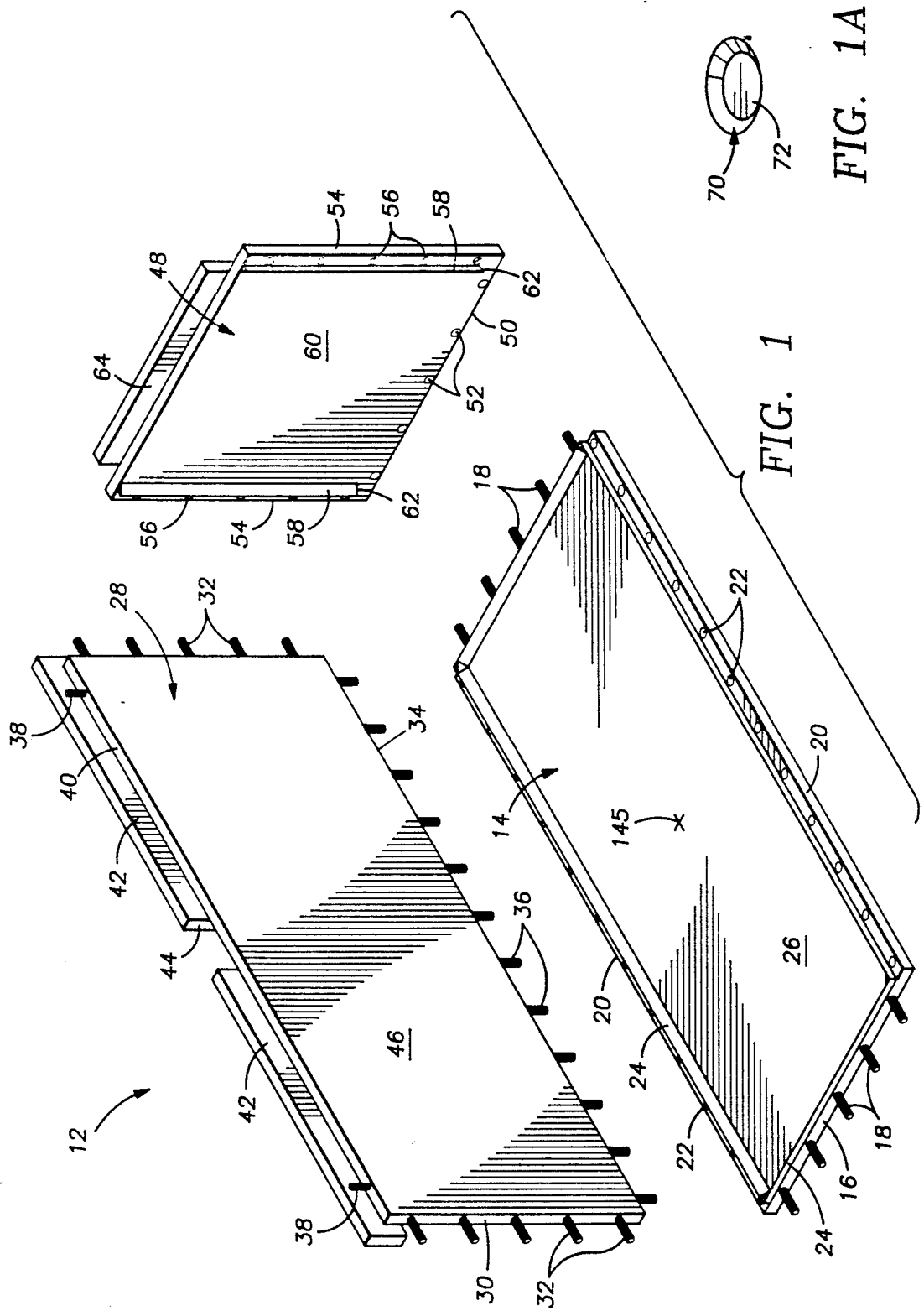
FIG. 1 is an exploded view of the elements which comprise the outer female mold.
FIG. 1A is a perspective view of the truncated conical piece which forms an opening in the upper horizontal wall of the form made in the preferred embodiment of the reuseable mold.

Referring to FIG. 1, the elements of the outer female mold 12 are illustrated, each of which are made of thermoplastic sheets. The preferred thermoplastic is high density polyethylene. A specific material of construction is 1" polyethylene sheets. Unless otherwise stated the specific material used to construct the mold 10 of the present invention will be illustrated by 1" polyethylene sheets. The outer mold 12 has a rectangular base 14. At the ends 16 of the base 14 are a number, such as five, spaced metal bolts 18 extending along the center line. Spaced from the sides 20 of the base 14 are a series of holes or openings 22 adaptable to receive a bolt as will be described in more detail hereinafter. Strips 24 of polyethylene, shaped as ⅜" right triangular molding with one side down on and another vertically extending from the top face 26 of the base 14, are screwed to the face 26. The screws are countersunk and the heads are covered with a hot glue or wax (not shown). A suitable material is the glue used in a craft hot gun. The glue or wax is sanded to a smooth surface after cooling. The outer mold 12 has two rectangular sides 28. At the ends 30 of the side 28 are a number, such as five, spaced metal bolts 32 extending along the center line. Along the centerline of the bottom 34 of the sides 28 are a series of metal bolts 36. The number of bolts 36 are the same number as the openings 22 and have the same spacing such that the bolts 36 may pass easily through the openings 22 for bolting the sides 28 to the base 14. Two metal bolts 38, one near each end 30 of the side 28, extend from the top 40 of the sides 28. Further two strips 42 are screwed to the outer surface or the opposite surface from the inner surface or face 46 of the side 28 so as to extend above the top 40 and are spaced to leave a slot 44. The purpose of the bolts 38 and the strips 42 will be described in more detail hereinafter. The outer mold 12 has two ends 48. Spaced from the bottom 50 of ends 48 are a series of holes or openings 52 adaptable to receive bolts 18 extending from the ends 16 of base 14. Likewise, spaced from the side edges 54 are a series of holes or openings 56 spaced and of the same number to receive bolts 32 extending from the ends 30 of the sides 28. Strips of polyethylene 58, the same as strips 24, are screwed to the face 60 of the ends 48 parallel to the side edges 54. When the ends 48 are bolted to the base 14, the bottom 62 of the strips 58 sit on the strips 24 and further, the face 46 of sides 28 abut the vertically extending flat side of strips 58. A strip 64 is screwed to the outer surface or the side opposite of the face 60 of ends 48, the purpose of which will be described in more detail hereinafter.

It is clear that when the sides 28 and the ends 48 are bolted to the base 14 that the outer dimensions of the cast form are defined by the inner dimensions of the outer form 12. The form will have a top wall with a width being the dimension between the faces 46 of the sides 28 and a length being the dimension between the faces 60 of the ends 48. The strips 24 and 58 provide a chamfered edge to the form rather than sharp edges which are subject to being broken. According to the preferred embodiment, the cast form has an opening in the top wall. To form the opening, referring to FIG. 1A, a truncated cone piece 70 with tapered sides, preferably 45°, is placed in the center of face 26 of base 14. The piece 70 is placed with the larger diameter facing upward and the smaller diameter surface 72 on the face 26 of base 14. The smaller diameter surface 72 may be between 4" and 10".

Figure 2:
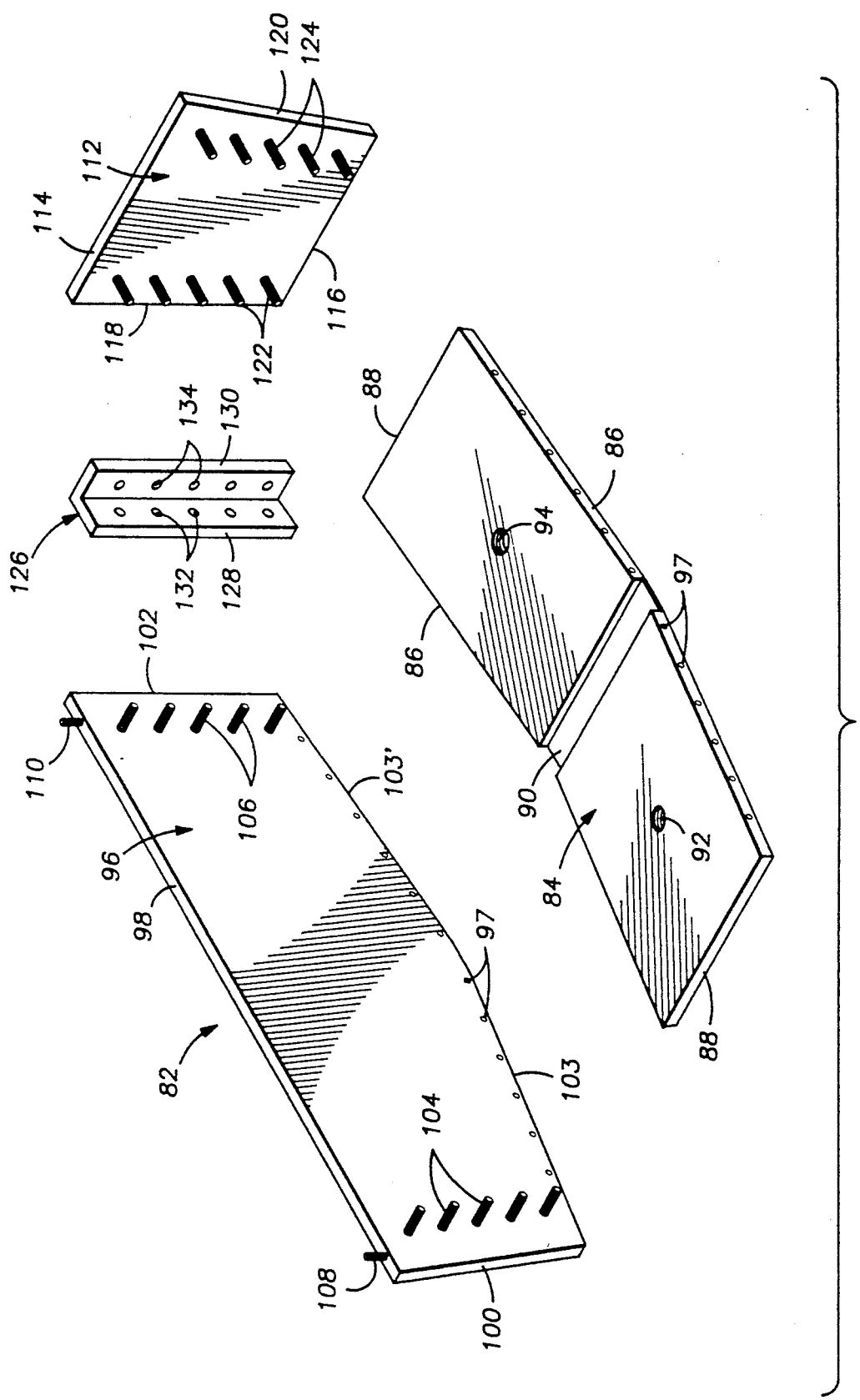
FIG. 2 is an exploded view of the elements which comprises the inner male mold.

Referring to FIG. 2, the elements of the inner male mold 82 are illustrated, each of which are made of sheets of thermoplastic resins. The inner mold 82 has a base 84, preferably made from a sheet of polyethylene. The base 84 has two sides 86 and two ends 88. A notch 90 extends between the sides 86 midway between the ends 88. The notch 90 permits the base 84 to be bent into a v-shape and provides a slight taper to the base 84 from the center to the ends 88. Two holes 92 and 94 are drilled and threaded in the center of each of the two halves of the base 84, the purpose of which will be explained in more detail hereinafter. The inner mold 82 has two pentagonal sides 96. The sides 96 are screwed (see screw holes 97) to the base 84. The sides 96 have a top edge 98 and two tapered edges 100 and 102, e.g. the bottom point of the side is $\frac{1}{8}$" to $1\frac{1}{4}$" less than square at the bottom. There are preferably two edges 103 and 103' at the bottom of the sides 96 to provide a slight taper and defining the v-shape of base 84 or having the same v-shape as base 84. In some instances, there is no need or desire to have the base tapered end-to-end and then the bottom of side 96 has only one edge 103. Parallel to the tapered edges 100 and 102 are a series of bolts 104 and 106; also, spaced from each of these edges and on the top edge 98 is a bolt 108 and 110, the function of which will be explained in more detail hereinafter. The edges 86 of base 84 are tapered. The screw holes in sides 96 are countersunk so the heads are below the outer surface and the countersink is filled with hot glue or wax. The inner mold 82 has two trapezodial ends 112. The longer edge is the top edge 114 and the shorter edge is the bottom edge 116. The tapered edges or sides 118 and 120 of ends 112 are tapered, e.g. the shorter edge is $\frac{1}{4}$" to $1\frac{1}{2}$" less than the longer edge. Parallel to the sides 118 and 120 are a series of bolts 122 and 124, the function of which will be explained in more detail hereinafter. The inner mold has four L-shaped braces 126 which secures the ends 112 and the sides 96 to complete the inner mold 82. Braces 126 are made of two strips 128 and 130 which are screwed together (not shown). Strip 128 has a series of holes or openings 132, the number and spacing being the same as the number and spacing of the bolts 106 of side 96, five for example, and spaced so that the bottom edge 116 of end 112 is flush with the upper surface of base 84. Strip 130 has a series of holes or openings 134, the number and spacing being the same as the number and spacing of the bolts 122 of end 112, five for example, and spaced so that the bottom edge 116 of end 112 is flush with the upper surface of base 84 but further that the outer surface of end 112 is flush with the edge 88 of base 84. The bottom edge 116 is tapered at the same angle as the angle of the v of the base 84. In this regard, the edges 86 of the base 84 will be tapered at the same angle as the taper of the edges 118 and 120 of the ends 112, respectively. Likewise, the edges 88 of the base 84 are tapered but at the same angle as the taper of the edges 100 and 102 of sides 96, respectively.

Figure 3:
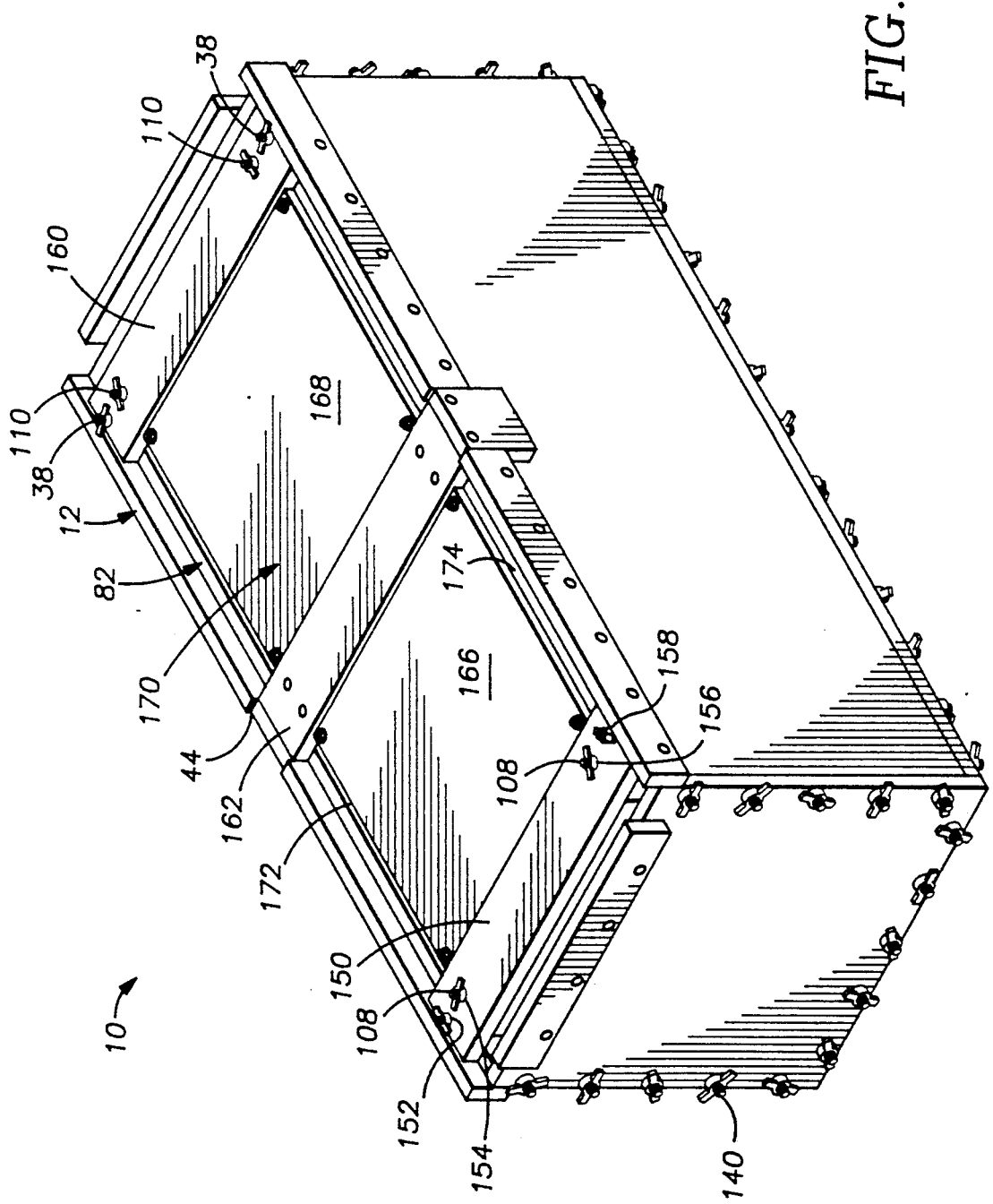
FIG. 3 is a perspective view of the assembled preferred embodiment of the reuseable mold of the present invention.

The outer female mold 12 and the inner male mold 82 which are the major structure of the reuseable mold 10 have been described with reference to FIG. 1 and FIG. 2. The assembled mold 10 is shown in FIG. 3. The order of assembly of the outer mold 12 or the inner mold 82 has no particular significance; however, a description of assembly of each mold is given to summarize the respective molds. To assemble the outer mold 12, the sides 28 are bolted the base 14 by passing the bolts 36 at the bottom of sides 28 through the openings 22 in the base 14. Wing nuts are used to secure the sides 28 to the base 14. When the sides 28 are secured to the base 14, the face 46 of the sides 28 abut and are in the same plane as the extending flat side of the strips 24 which are parallel to the edges 20 of the base 14. Further, the length of the sides 28 are the same as the length of the edges 20 of the base 14 and thus, the edges 30 of the sides 28 are flush with the edges 16 of the base 14. The ends 48 are then secured to the base 14 and sides 28 of the outer mold 12 by passing the bolts 16 and 32 through the openings 52 and 56, respectively, and placing wing nuts 140 securely on each bolt.

To fabricate the form with a hole or opening in the middle of the upper wall, the truncated cone piece 70 is placed in the center 145 of face 26 of base 14.

To assemble the inner mold 82, the sides 96 are screwed to the base 84. Holes 97 are drilled into sides 96 and while not shown specifically in the drawings, are countersunk so as to align with the edges 86 of the base 84. The screws used are metal screws and after being securely inserted, the heads of each screw is covered with a hot glue or wax. The glue or wax is allowed to cool and set and then the surface is sanded to assure a smooth continuous surface. The L-shaped braces 126 are assembled by screwing strip 130 to strip 128. The screws are countersunk so that the heads do not interfer with the assembly but since these are not surfaces which will contact the reinforced thermosetting resin used to fabricate the desired form, the filling of the openings with glue or wax is not necessary. A brace 126 is secured to a side 96 by passing the bolts 106 through the openings 132 and are tightly secured by hex nuts. After two braces 126 are secured to one end of inner mold 82, the end 112 is secured in place by passing the bolts 118 and 124 through the openings 134 of the respective brace 126. The other end 112 is secured in the same manner. Before the inner mold 82 is placed into the outer mold 12, the openings 92 and 94 are plugged with a material which will not stick to the aggregate filled thermosetting resin. Suitable material is pressboard or a polyurethane plug, especially a plug of closed cell polyurethane known as backed rod used in thermal expansion joints.

Referring now to FIG. 3, a strip 150 having a length the same as the outer dimension or width of the outer mold 12 has four openings 152, 154, 156 and 158. Openings 154 and 156 are spaced such that bolts 108 which are on the upper edge 98 of side 96 will pass through and strip 150 is secured to the inner mold 82 by wing nuts (not numbered). Likewise, a strip 160 is secured to the inner mold 82 by passing the bolts 110 through openings in strip 160 and securing by wing nuts. The two strips 150 and 160 provide easy means to lift the inner male mold 82 and place into the female outer mold 12. The base 84 of the inner mold 82 will sit on the cone piece 70; however, the openings 152 and 158 in strip 150 and the corresponding openings in strip 160 are aligned with bolts 38 on the upper edge of sides 28 to allow the bolts to pass through. The strips 150 and 160 are secured with wing nuts. When secured, the strips 150 and 160 align the inner mold 82 within the outer mold 12 such that there is a space between the respective bases 14 and 84, the respective sides 28 and 96 and the respective ends 48 and 112. The dimension of the space is the thickness of the form being fabricated. This space thickness or dimension between the bases, sides and ends may vary from ⅛" to over 2".

As is shown in FIG. 3, the hollow opening at the top of the inner mold 82 is closed by the strips 150 and 160, a U-shaped center strip 162 and two rectangular cover pieces 166 and 168. The width of the strip 162 is the same as the gap 44 between strips 42 on the upper edge 40 of sides 28. The three strips 150, 160 and 162 together with the two rectangular cover pieces 166 and 168 provides a surface 170 for pouring the mixed slurry of aggregate filled thermosetting resin.

A pourable slurry of an aggregate filled thermosetting resin is prepared. The Part A resin is mixed in desired proportions with the Part B hardener and sand and aggregate are mixed. The slurry is poured out on the surface 170 and the slurry is troweled into the space 172. By filling the space from one side, the air in the space between the outer and inner mold is pushed out as the slurry flows down the space on the one side 172 and under the base 84 of the inner mold 82 and up the space 174 on the other side. The function of the strips 42 on the sides 28 are clear in that the slurry as it is introduced into the gap does not go over the top edge 40 and fall on the floor. When the spaces 172 as well as 174 and the space between the respective ends are filled, slurry is introduced all around to make certain that the full height of the form being fabricated is achieved.

The forms when assembled may be placed on a dolly before being filled with the aggregate filled thermosetting resin. The filled reuseable form 10 may be rolled to a place to cure or placed in a oven to accelerate the curing. The oven need be heated only to 150° F. for the time of curing to be greatly reduced. The form 10 is allowed to cool which will give an indication that the curing process is complete.

Figure 4:
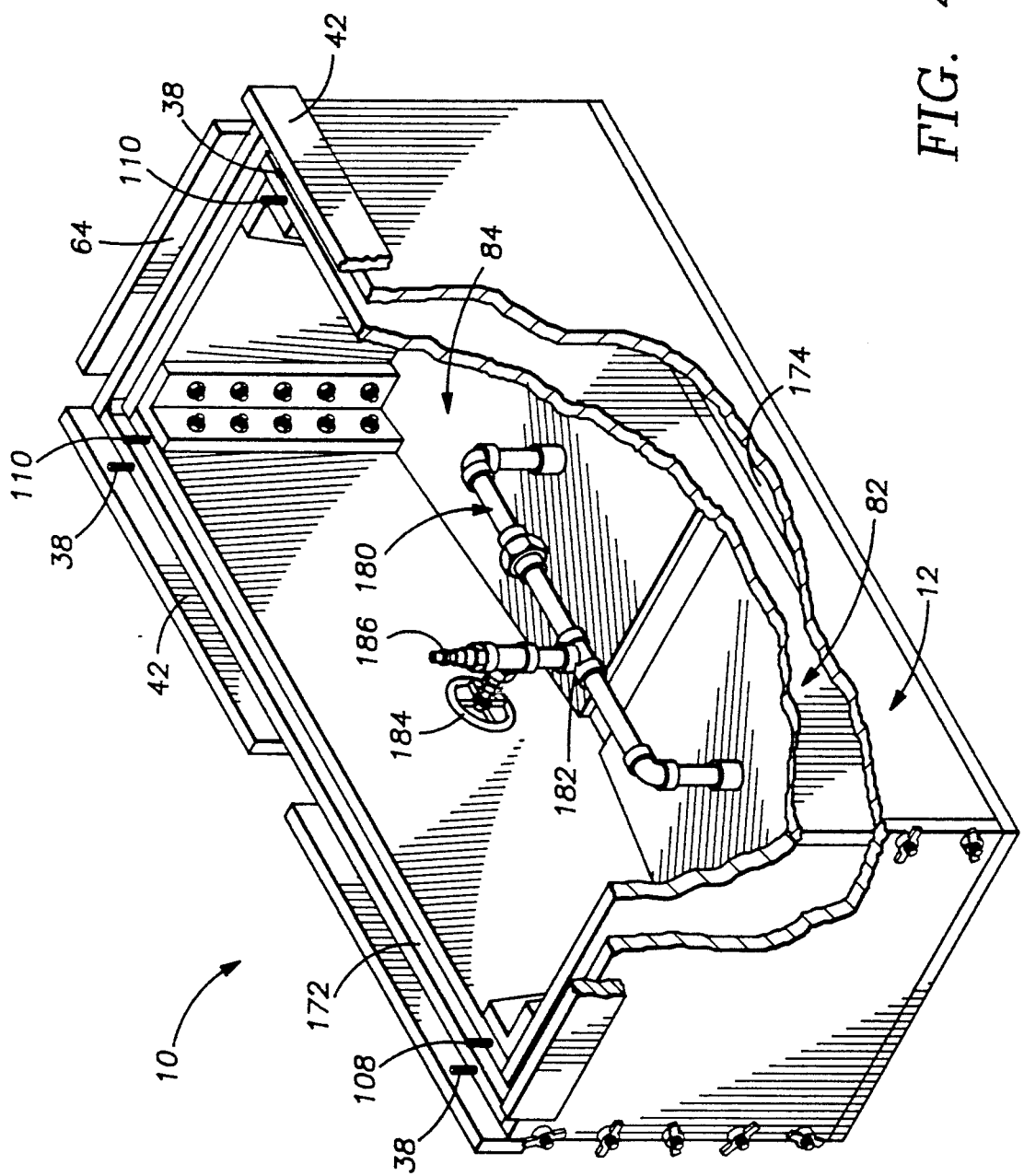
FIG. 4 is a perspective view of the preferred embodiment of the reuseable mold of the present invention with a partial cutaway portion to show the air supply attached to pop or remove the inner mold from the form cast in the reuseable mold.

After the aggregate filled thermosetting resin cures, the cast form is removed from the reuseable mold 10 of the present invention. Referring to FIG. 4, the strip 162 and the two rectangular covers 166 and 168 are removed exposing the hollow inner mold 82. The plugs placed into openings 92 and 94 are removed. Into each opening 92 and 94 is inserted a piece which has a threaded end and at the other end has a connector for a pipe. An air supplier 180 is connected to each of the connectors in openings 92 and 94. The air supplier 180 may include a tee 182 having a valve 184 extending above the tee 182 and then a snap connector 186 which connects to a air compressor line (not shown). Pipes extend from the tee 182 and form a U-shaped piece which connects to the pieces in openings 92 and 94. The air supplier 180 is connected and the air compressor line (not shown) attached. The compressor is started to provide air under a pressure of 75 to 300 psi and valve 184 is opened. A rubber mallet may be used to pound on the inner faces of the inner mold 82. When the air is supplied through the openings 92 and 94, the inner mold 82 pops or is lifted from the cast form. The strips 150 and 160 may have already been removed or may be used to lift the inner mold 82 from the form. The outer mold 12 may be disassembled by removing the ends 48 and then the sides 28 by first removing the wing nuts.

The present invention is further illustrated by the following example:

EXAMPLE

A form to be used as an element of a corrosion resistant unified supporting foundation is fabricated having the following dimensions: 45" long × 18" wide × 18" tall.

A entire reuseable mold 10 is fabricated from 1" polyethylene sheets. The outer mold 12 is fabricated using one sheet of polyethylene, 45" long and 20" wide, forming the base 14. Two sheets of polyethylene, 45" long and 18" high, form the sides 28. Two sheets of polyethylene, 20" wide and 19" high, form the ends 48. Along a centerline ⅜" from the edge 20 of base 14, twelve (12) openings are drilled into the base 14 on each centerline or 12 on each side and a corresponding twelve ⅜" bolts are screwed into the bottom edge of sides 28. At each end 16 of the base 14, five ⅜" bolts are equally spaced or a total of ten bolts. Also along each end 30 of the two sides 28, five ⅜" bolts are equally spaced or a total of twenty bolts. Bolt holes are drilled in end 48 to correspond to the fifteen bolts on each end of the base and sides. A ⅜" right triangular strip of polyethylene is cut into appropriate lengths and screwed to the base and ends as described above so that the form will have chamfered edges.

An inner male mold 82 is fabricated using a sheet of polyethylene, 44"×12¾", as the base 86. A ¾" slot is formed on the upper surface on the center line (22" from either end) which is about ½" deep. The slot aids in being able to bend the sheet and form the v-shaped tapered bottom of the inner mold 82. Two threaded holes, each centered in each half of the base, are drilled for a ⅜" pipe connection. Two sheets of polyethylene, 42½"×17¼", when cut become the sides 96. The sheets are cut first to provide tapered side edges 100 and 102 by marking a line approximately 3" above the bottom edge and marking a point ½" from each side such that the distance between the points on the line or the bottom of these edges is 41½". The bottom edges 103 and 103' are formed by bending the base on each side sheet so that the center of the base is centered on the bottom edge of the side and the bottom edge of the base is bent to the marked points and the excess portion of the side sheet which is below the bent base is cut off. Four braces 126 are fabricated by screwing together a 4"×13" strip and a 3"×13" strip and spacing five equally spaced holes in each strip. Two sheets of polyethylene, 14"×16", when cut become the ends 112. At the bottom edge (14") of each sheet, a point is made ½" in and the side edges cut to be 14" apart at the top and 12¾" at the bottom. The screws are placed into the side sheets and end sheets so that the braces secure the ends between the side sheets and flush with the ends of the base sheet.

Three strips of polyethylene, 20"×3", and two strips, 3"×3", are cut. The two three inch strips are screwed to the ends of one of the 20"×3" strip and it become strip 162. Four holes are drilled into the other 20"×3" strips and they become strips 150 and 160. Two sheets of polyethylene, 16"×16¾", are the covers 166 and 168.

A piece of ¾" pressboard is cut with a saw at a 45° angle to cut a circle having a 5" diameter. This piece is used to form the opening in the top wall of the form being cast.

The molds are assembled using the ⅜" wing nuts for the ⅜" bolts or ⅜" hexagonal nuts with the braces. Sheet rock screws, ¼"×1⅜", are used in screwing the inner mold sides to the base and the brace strips together. They are also used to screw the strips 42 and 64 to the sides and ends, respectively, of the outer female mold. A commercial hot glue gun is used to fill all the exposed screw heads with the glue provided. After assembling the inner mold 82, all exposed or outer surfaces are sanded so that the entire outer surface is only smooth polyethylene or a sanded glue.

The circular piece of pressboard is placed at the center 145 of the base of the outer mold. The openings 92 and 94 are plugged with pieces of polyurethane backer rod material and the inner mold is placed inside the outer mold. With strips 150 and 160 bolted to the top of the inner mold and lowered onto the bolts 38 on the outer mold, there is no problem spacing the two molds. The strips including strip 162 are secured and the covers 166 and 168 are screwed in place.

A pourable blend of thermosetting resin is prepared as follows:
  6 parts of DER 324 (an epoxy resin of Dow Chemical Company)
  1 part of DEH 58 (an epoxy hardener of Dow Chemical Company)

Into the combined resin is mixed approximately 27 pounds of commercial aggregate and 27 pounds of sand. The mixture is continually mixed as the aggregate and sand are added and mixed to assure that the resin is well dispersed throughout the mixture. By adding more DER 324 the mixture may become more flowable.

Each batch of aggregate filled resin is poured on the upper surface 170 of the inner mold and trowled into the gap on one side between the outer and inner molds. This is continued until the gap on the other side and the two ends are substantially filled. The resin mixture is then added to the gaps all around to fill to the top.

The filled mold is placed into a oven, e.g. a closed structure having heat lamps which heats to 125°–165° F., for about one hour to quicken the cure time. After being taken out and allowed to cool for about two hours, the outer mold is ready to be disassembled. The condition of the cast form will determine how quickly the inner mold can be removed. The inner mold is removed by removing the two covers 166 and 168 and strip 162. The plugs filling the openings 92 and 94 are removed and the air supply 180 is connected. Upon opening valve 184 to a supply of air at a pressure of 120 psi, the inner mold pops and is lifted so that it is easily removed.

EXAMPLE 2

An inner mold is fabricated without the braces of Example 1. In this instance the ends 112 of the inner mold have dimensions two inches greater and the sides 96 two inches shorter, and the ends 112 are screwed to the ends of sides 96 and base 84. All screws are countersunk and the heads filled with hot glue.

EXAMPLE 3

An inner mold is fabricated with no taper on the base, i.e. the sides are trapezoidal and the base is a flat sheet. When casting a form the circular preeboard piece is not used. The cast form fabricated is especially useful as a sump liner.

EXAMPLE 4

An inner mold is fabricated with ends that are flush with the ends of the outer mold, i.e. there are no gaps between ends. The cast form fabricated is especially useful as trench liners. A modification is an inner form that is shaped so that one end provides a tung and the other end with a groove so that each form is easily connected.

An especially desirable feature of the reusable molds is that lamenated or different resins may be used to fabricate or cast the form. For example, the outer surface of the form may be cast from an aggregate filled thermosetting resin that has special corrosion resistance or special appearance qualities. The aggregate, for example, may be colored for appearance or the resin chosen for its formulated resistance to corrosion to the materials the form may be in contact. The lamenated forms may be fabricated by either first coating the inside of the outer mold with an aggregate filled thermosetting resin and allowing that resin to cure before placing the inner mold into the outer mold or using two different inner molds. When using two inner molds, the first of the inner molds provides a small gap between it and the outer mold while the second inner mold provides a larger gap.

EXAMPLE 5

An outer mold is fabricated and assembled as in Example 1. The inside surface is gel coated or coated with a thin coating. A 60 mil coating is sprayed and cured on the inside surface using:
  Koch EN −25.3 (an epoxy coating of Koch Corrosion Company)
  4 parts of resin and 1 part hardener (all parts by volume).

The inner mold which is fabricated and assembled as in Example 1 is placed inside the outer mold. The gap, diminished by the 60 mil coating, between the two molds is filled with:
  6 parts of DER 324 (an epoxy resin of Dow Chemical Company)
  1 part of DEH 58 (an epoxy hardener of Dow Chemical Company)
(all parts by volume) and a blended aggregate as in Example 1.

EXAMPLE 6

A colored form is fabricated using two inner molds. An inner mold is fabricated such that the gap between it and the outer mold is only ⅛" and the gap is filled with:
  2 parts of a clear resin and 1 part hardener (by volume) filled with:
  3M Colorquartz sand (a product of the 3M Corporation), a product which is available in a number of colors.

After the first resin is cured, the first inner mold is removed as explained in Example 1 and the second inner mold is inserted for filling the gap between the first coating and the second inner mold with:
  6 parts DER 324

1 part DEH 58
(all parts by volume) and filled with a blended aggregate as set forth in Example 1.

The foregoing examples are only illustrations of some variables which are possible in regard to the present invention.

We claim:

1. A reuseable mold for producing a cast rectangular hollow form made of a reinforced thermosetting resin which comprises:
   an outer female mold comprising a base, two sides and two ends, each made of a thermoplastic sheet; said two sides bolted to said base and said ends bolted to said base and sides; each of said sides and ends having a thermoplastic strip secured to the outside and raised above the top edge of said sides and ends, respectively;
   an inner male mold comprising a v-shaped base, two pentagonal sides and two trapezoidal ends, each made of a thermoplastic sheet, said v-shaped base having plugable openings for connecting an air supply;
   means for securing said inner mold in said outer mold to maintain a space between the respective bases, sides and ends for pouring a slurry of reinforced thermosetting resin including a truncated conical piece placed at the center of the base of the outer mold with the smaller diameter on the outer mold; and
   thermoplastic cover means for covering the opening of said inner mold.

2. A reuseable mold according to claim 1 wherein said means for securing said inner mold in said outer mold comprises two thermoplastic strips secured at the top of the ends of said inner mold and secured to the top of said outer mold.

3. A reuseable mold according to claim 2 wherein said thermoplastic strips are secured by bolts and nuts.

4. A reuseable mold according to claim 1 wherein said thermoplastic is polyethylene.

5. A reuseable mold according to claim 1 wherein said thermoplastic is 1" polyethylene sheets.

6. A reuseable mold according to claim 1 which further includes four thermoplastic chamfer pieces secured to said base of said outer mold forming a rectangle, the rectangle being the outer dimensions of the top of the form being cast.

7. A reuseable mold according to claim 1 which further includes two thermoplastic, vertically extending chamfer pieces secured to each of said ends of said outer mold, the pieces being the outer dimensions of the ends of the form being cast.

8. A reuseable mold according to claim 1 which further includes four thermoplastic chamfer pieces secured to said base of said outer mold forming a rectangle, the rectangle being the outer dimensions of the top of the form being cast and two thermoplastic, vertically extending chamfer pieces secured to each of said ends of said outer mold, the pieces being the outer dimensions of the ends of the form being cast.

9. A reuseable mold according to claim 1 wherein said means for securing said inner mold in said outer mold comprises two thermoplastic bars secured at the top of the ends of said inner mold and secured to the top of said outer mold and a thermoplastic bar secured at the center of the sides of said inner mold and secured to the sides of said outer mold.

10. A reuseable mold for producing a cast rectangular hollow form made of a reinforced thermosetting resin which comprises:
    an outer female mold comprising a base, two sides and two ends, each made of a thermoplastic sheet;
    an inner male mold comprising a v-shaped base, two sides and two trapezoidal ends, each made of a thermoplastic sheet, said base having plugable openings for connecting an air supply; and
    means, including a truncated conical piece placed with the smaller diameter on the outer mold, for securing said inner mold in said outer mold to maintain a space between the respective bases, sides and ends for pouring a slurry of reinforced thermosetting resin.

11. A reuseable mold according to claim 10 wherein said thermoplastic is 1" polyethylene sheets.

12. A reuseable mold according to claim 11 which further includes a valved air supply means for connecting to said openings in said base of the inner mold.

* * * * *